United States Patent
Frolov et al.

(10) Patent No.: US 10,016,824 B2
(45) Date of Patent: Jul. 10, 2018

(54) BEVEL MECHANISM FOR A POWER SAW

(71) Applicants: Robert Bosch Tool Corporation, Broadview, IL (US); Robert Bosch GmbH, Stuttgart (DE)

(72) Inventors: Andrew Frolov, Glenview, IL (US); Brian Taylor, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 31 days.

(21) Appl. No.: 14/200,138

(22) Filed: Mar. 7, 2014

(65) Prior Publication Data
US 2014/0311312 A1 Oct. 23, 2014

Related U.S. Application Data

(60) Provisional application No. 61/779,183, filed on Mar. 13, 2013.

(51) Int. Cl.
   B23D 45/06 (2006.01)
(52) U.S. Cl.
   CPC ......... B23D 45/068 (2013.01); *Y10T 83/7705* (2015.04)
(58) Field of Classification Search
   CPC ........................... B23D 45/068; Y10T 87/776
   USPC ...... 83/473, 471.3; 30/388; 144/252.1–252.2
   See application file for complete search history.

(56) References Cited

U.S. PATENT DOCUMENTS

| | | | | |
|---|---|---|---|---|
| 3,712,163 | A | * | 1/1973 | Vinson ................... B21D 28/04 83/206 |
| 3,880,032 | A | * | 4/1975 | Green .......................... 83/102.1 |
| 5,040,444 | A | | 8/1991 | Shiotani et al. |
| 5,404,779 | A | * | 4/1995 | Break .......................... 83/471.3 |
| 5,720,213 | A | * | 2/1998 | Sberveglieri ................. 83/471.3 |
| 5,819,625 | A | * | 10/1998 | Sberveglieri ................. 83/471.3 |
| 6,820,524 | B1 | * | 11/2004 | Ceroll et al. ...................... 83/13 |
| 7,721,633 | B2 | | 5/2010 | Gaw |
| 8,752,462 | B2 | * | 6/2014 | Frolov ................. B23D 59/006 83/100 |
| 8,844,415 | B2 | * | 9/2014 | Taylor ............................... 83/99 |
| 2002/0005103 | A1 | | 1/2002 | Ceroll et al. |
| 2004/0118261 | A1 | * | 6/2004 | Garcia et al. ................ 83/471.3 |

(Continued)

OTHER PUBLICATIONS

International Search Report and Written Opinion corresponding to PCT Application No. PCT/US2014/021993, dated Jun. 20, 2014 (14 pages).

*Primary Examiner* — Andrea Wellington
*Assistant Examiner* — Fernando Ayala
(74) *Attorney, Agent, or Firm* — Maginot Moore & Beck LLP

(57) ABSTRACT

A table saw includes a support arrangement and a table top assembly including a work piece support surface defining a plane and a saw blade opening in the work piece support surface. An undercarriage assembly, mounted to the table top assembly, supports a saw blade in an adjustable angular position and includes a motor assembly and an arbor shaft to support the saw blade in the saw blade opening. The bevel pivoting mechanism is configured to increase a distance between the motor or arbor shaft and the plane of the work piece support surface with a change to the angular position of the saw blade to substantially prevent the motor or arbor from contacting the table top assembly.

18 Claims, 14 Drawing Sheets

(56) References Cited

U.S. PATENT DOCUMENTS

2008/0041210 A1  2/2008  Tseng
2011/0203438 A1* 8/2011  Nenadic ............... B23D 47/025
                                             83/477.2

* cited by examiner

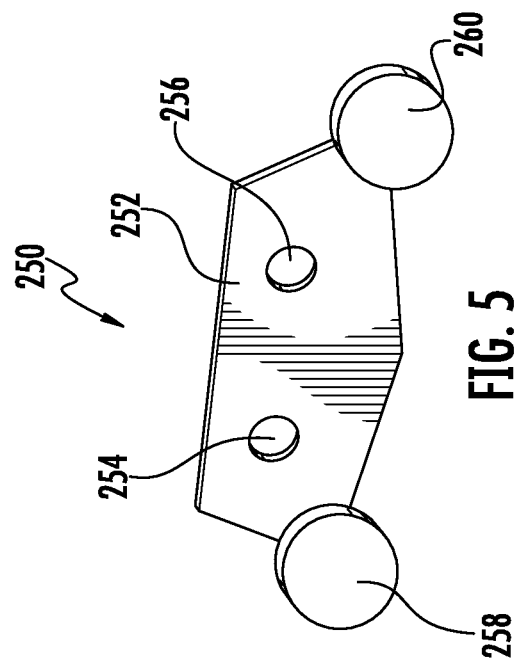
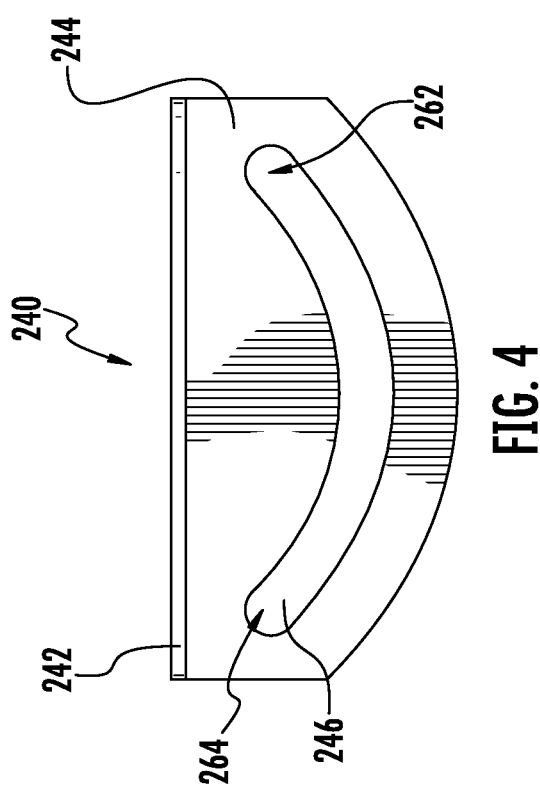

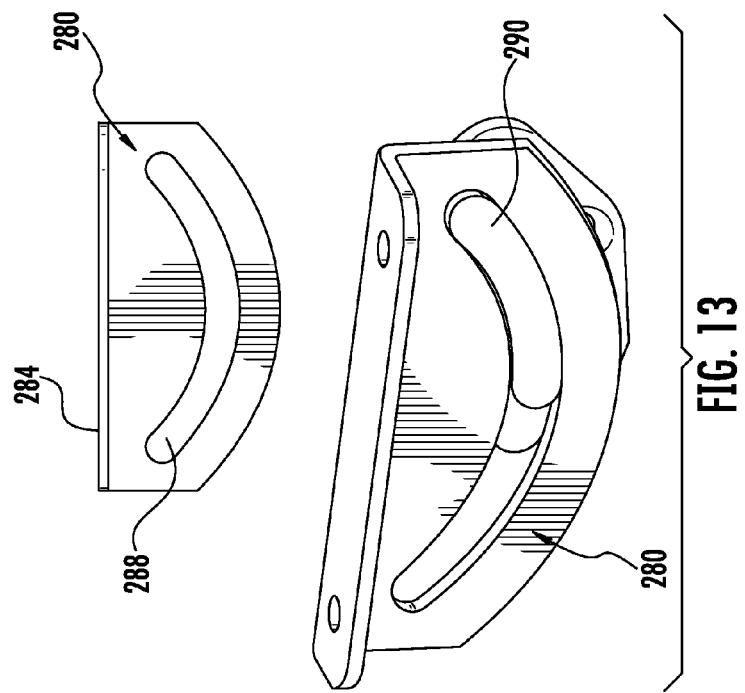
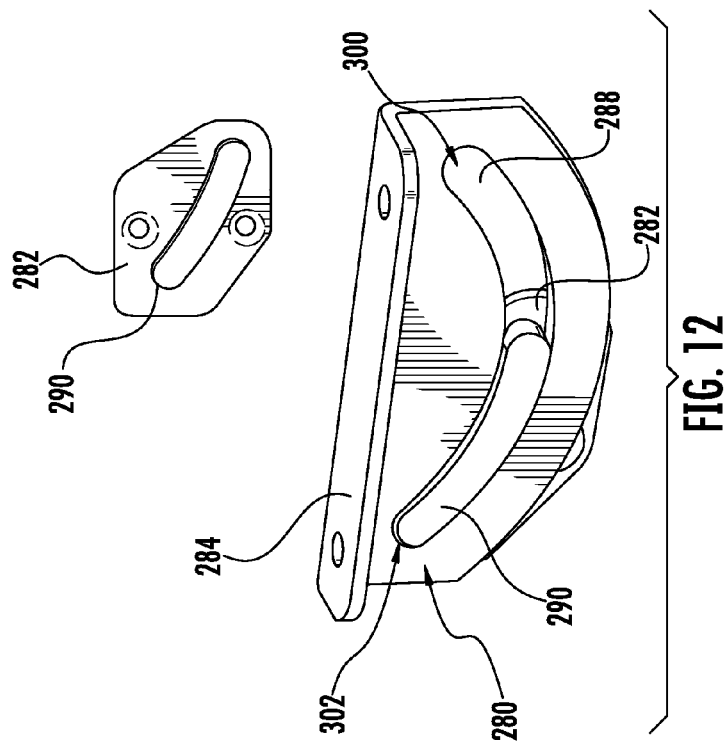

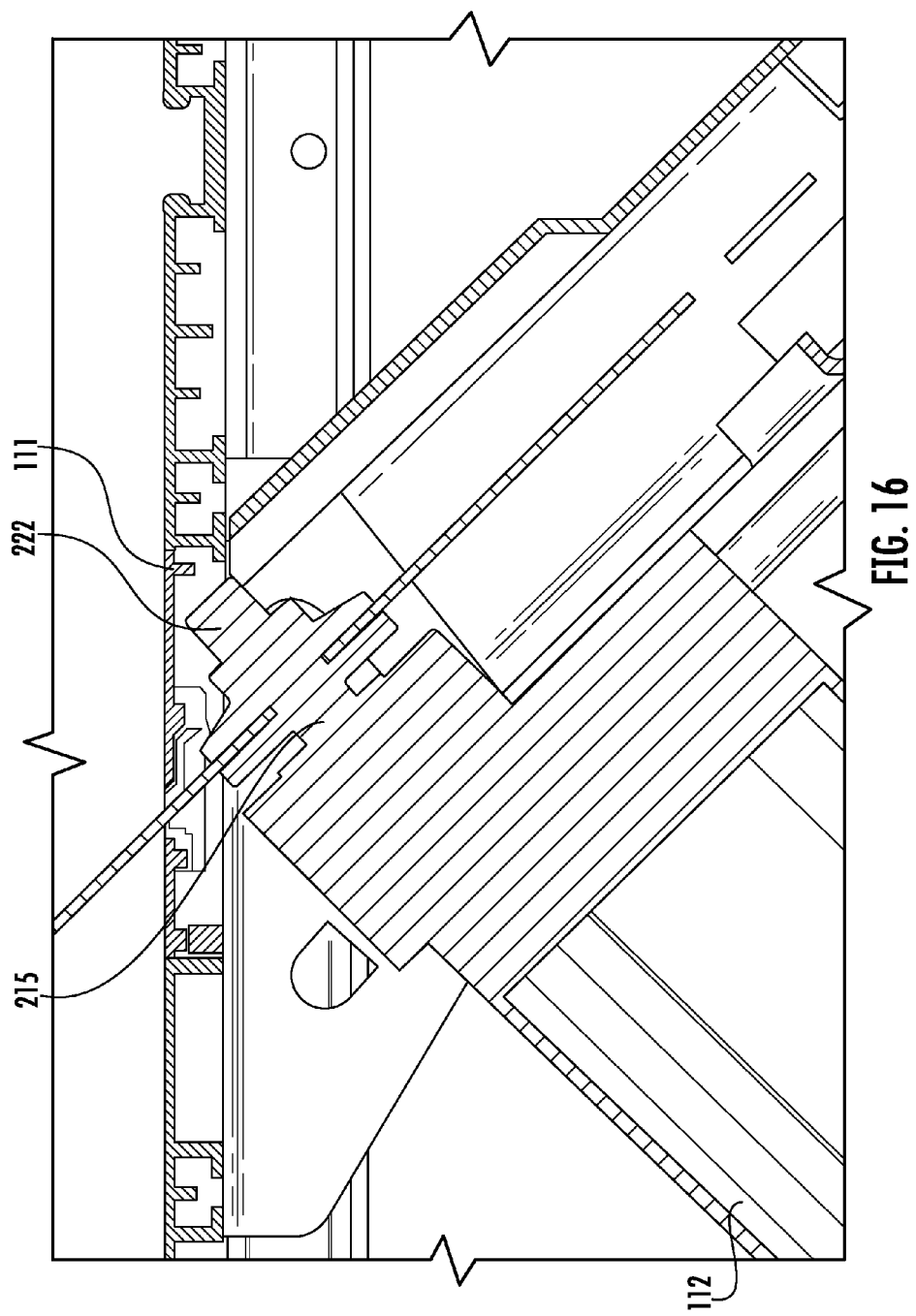

BEVEL MECHANISM FOR A POWER SAW

This application claims priority to U.S. Provisional Patent Application Ser. No. 61/779,183 entitled "Bevel Mechanism for a Power Saw" by Frolov et al., filed Mar. 13, 2013, the disclosure of which is herein incorporated by reference in its entirety.

FIELD

The invention relates to a power saw, and in particular to a bevel mechanism for a power table saw.

BACKGROUND

Power table saws are used by individuals at home or in the construction industry at a jobsite. In particular, at a construction jobsite where workers cut and shape a large number of wood products, portable table saws are used. For example, framers use portable table saws for rough-cutting lumber, while finishing carpenters use portable power table saws capable of making rip and miter cuts for producing precise finishing cuts of trim pieces.

Most portable power table saws that are currently commercially available have an undercarriage assembly which permits vertical as well as angular adjustability of a driven saw blade that extends through an opening in the table top. Such adjustability enables the height of the blade to be controlled for making safe and accurate cuts on a work piece by the table saw, and the angular adjustability enables the blade to be positioned to provide bevel cuts.

The power table saws are also used by individuals or carpenters for producing precise finish work in construction for a home or office. Consequently, additional accessories are often used, in addition to the standard saw blade used for making rough cuts of lumber and relatively simple linear cuts having the width of the standard saw blade. One such accessory blade is known as a "dado" set or dado blade.

A dado set is one type of a circular saw blade which is used with a table saw or a radial arm saw to cut grooves in lumber or other cutting stock. The dado set includes one or more blades, known as a stacked dado set, wherein multiple blades are stacked side by side to make the cut or groove. Depending on the width of the groove, one dado blade can be sufficient to make a desired groove. In other situations, multiple dado blades are stacked, which of course not only makes the groove wider, but also increases the width of the dado set.

Another type of dado is known as a wobble blade or wobble dado which is mounted on a multi-part adjustable hub. The wobble dado is a single circular blade that mounts at an angle on an arbor shaft of the table saw. The width of the groove being cut depends on the angle of the wobble blade with respect to the arbor shaft. When the angle increases, so does the width of the cut.

When used with a table saw, the dado blade extends from underneath and up through an aperture disposed in a table top of the table saw. The aperture is configured to include a length greater than the diameter of a circular saw blade for which the table saw is intended and consequently is sufficiently long to accommodate the majority of dado blades. In addition, the aperture includes a width sufficient to accommodate the width of the most commonly used saw blades for use with the table saw. Because the table saw is also used with dado sets having varying widths of cuts, the table top of the table saw includes a throat insert, also known as a table insert. Different throat inserts are used for a standard blade and for a Dado blade each of which includes a different width aperture. Some table saws can include an insert which can be removed and inserted into a predetermined location in the table top such that a variety of widths of saw blades and dado sets can be used.

SUMMARY

According to one embodiment of the present disclosure, there is provided a table saw including a support arrangement and a table top assembly connected to the support arrangement wherein the table top assembly includes a work piece support surface defining a workpiece support plane and a saw blade opening in the work piece support surface. An undercarriage assembly, mounted to the table top assembly and configured to support a saw blade in an adjustable angular position relative to the work piece support plane includes (i) a motor assembly including an arbor shaft to support the saw blade in the saw blade opening and (ii) a bevel pivoting mechanism operatively coupled to the motor assembly. The bevel pivoting mechanism is configured to (i) increase a distance between the arbor shaft and the plane of the work piece support surface and (ii) change the angular position of the saw blade with respect to the work piece support surface. This arrangement is configured to substantially prevent the motor or arbor from contacting the table top assembly during position of the blade.

BRIEF DESCRIPTION OF THE DRAWINGS

FIG. 4 is an elevational plan view of a table mounting bracket.

FIG. 5 is an elevational plan view of an undercarriage mounting bracket.

FIG. 12 is a plan view of a bevel pivoting mechanism with an inset illustration of an undercarriage mounting bracket.

FIG. 13 is a plan view of a bevel pivoting mechanism with an inset illustration of an undercarriage mounting bracket

FIG. 16 is a sectional view of a motor having zero interference with a table saw insert at forty-seven degrees bevel angle.

DETAILED DESCRIPTION

Figure 1:
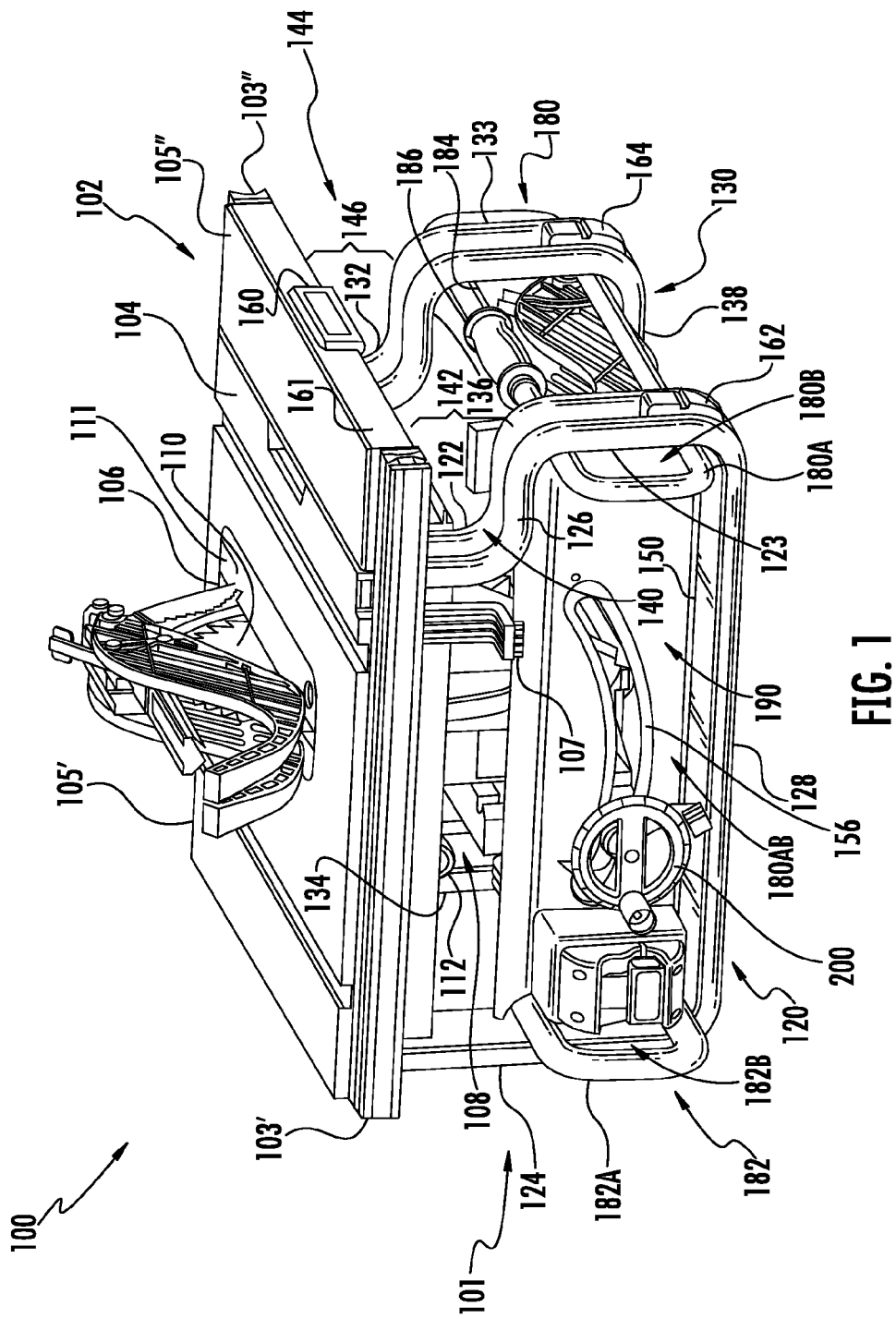
FIG. 1 is a perspective view of a portable power table saw.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Referring to FIG. 1, a table saw assembly 100 is depicted. The table saw assembly 100 includes a support arrangement generally referenced by the reference numeral 101. The table saw assembly further includes a table top assembly 102. The table top assembly 102 includes rails 103' and 103", a main table portion 105', an extension table portion 105", a saw blade opening 106, and a table extension lock lever 107. The saw blade opening 106 is formed substantially centrally in the main table portion 105'. The main table portion 105' and the extension table portion 105" define a work piece support surface 104. The extension table portion 105" is positionally aligned with the main table portion 105' and is configured to couple to the rails 103' and 103". The table extension lock lever 107 is configured to lock in the extension table portion 105" with the rails 103' and 103". The table top assembly 102 is connected to the support arrangement 101.

The table saw assembly 100 also includes a saw assembly or saw undercarriage assembly 108. The saw undercarriage assembly 108 includes a blade 110 rotatably mounted onto a motor 112 (shown in greater detail in FIG. 2). The blade 110 is configured to extend through the blade opening 106 in a table insert 111 and is further configured to raise, lower and bevel with respect to the work piece support surface 104, as further described below.

The support arrangement 101 of the table saw assembly 100 includes front and rear leg units 120 and 130. The front leg unit 120 includes downwardly extending leg portions 122, 123, and 124. The front leg unit 120 also includes transversely extending leg portions 126 and 128. The rear leg unit 130 includes downwardly extending leg portions 132, 133, and 134.

The space between the transversely extending leg portion 126 and the table top assembly 102 defines a rip fence storage space 140, while the space between the transversely extending leg portion 136 and the table top assembly 102 defines a storage space 144. Also, the vertical opening between the downwardly extending leg portion 123 and the table top assembly 102, defines an access opening 142. Similarly, the vertical opening between the downwardly extending leg portion 133 and the table top assembly 102, defines an access opening 146.

The downwardly extending leg portion 122 of the front leg unit 120 as well as the downwardly extending leg portion 132 of the rear leg unit 130 are connected to the bottom of the table top assembly 102, and in particular to the bottom surface or to the side surfaces of the main table portion 105'. Similarly, the downwardly extending leg portion 124 of the front leg unit 120 as well as the downwardly extending leg portion 134 of the rear leg unit 130 are connected to the bottom of the table top assembly 102, and in particular to the bottom surface or to the side surfaces of the main table portion 105'. Other connection configurations are also possible. For example, the downwardly extending leg portions 124 and 134 are connected to the bottom surface of the main table portion 105', while the downwardly extending leg portions 122 and 132 are connected to the side surfaces of the main table portion 105'.

The transversely extending leg portion 126 connects the downwardly extending leg portion 122 to the downwardly extending leg portion 123. The transversely extending leg portion 128 connects the downwardly extending leg portion 123 with the downwardly extending leg portion 124. Similarly, the transversely extending leg portion 136 connects the downwardly extending leg portion 132 with the downwardly extending leg portion 133. Also, the transversely extending leg portion 138 connects the downwardly extending leg portion 133 with the downwardly extending leg portion 134.

The table saw assembly 100 further includes a panel 150. The panel 150 includes an arc-shaped aperture 156 configured to receive a user actuator 200 coupled to an adjustment mechanism describe later herein. The adjustment mechanism includes various actuators to adjust the height and the bevel angle of the saw blade 110. Side to side movement of the user actuator along the path of the aperture 156 provides for the bevel adjustment.

The table saw assembly 100 also includes bumpers 160, 162, and 164. The bumper 160 is secured to one lateral side 161 of the table top assembly 102. The bumper 162 is secured to the downwardly extending leg portion 123 and the transversely extending leg portion 128. The bumper 164 is secured to the downwardly extending leg portion 133 and the transversely extending leg portion 138.

The table saw assembly 100 further includes handle units 180, 182. The handle units 180, 182 respectively include extension elements 180A and 182A extend from the support arrangement 101 and which define extension spaces 180B and 182B. The handle units 180 and 182 are fastened to the downwardly extending leg portions 123 and 124 of the front leg unit 120 and to the downwardly extending leg portions 133 and 134 of the rear leg unit 130 (e.g., welded or screwed). The handle unit 180 defines a closed loop form and includes a linearly extending handle portion 184. The linearly extending handle portion 184 is positioned adjacent to both the transversely extending leg portions 126 and 136. A protection zone 180AB is defined between the extension spaces 180B and 182B. The extension spaces 180B and 182B are configured such that certain actuators are completely contained within the protection zone 180AB.

A hand grip 186 (see FIG. 1) is attached to and surrounds the linearly extending handle portion 184. The front leg unit 120 also defines a leg opening 190. The leg opening 190 is defined by an interior surface of the front leg unit 120. The handle units 180 and 182 extend through the leg opening 190.

Figure 2:
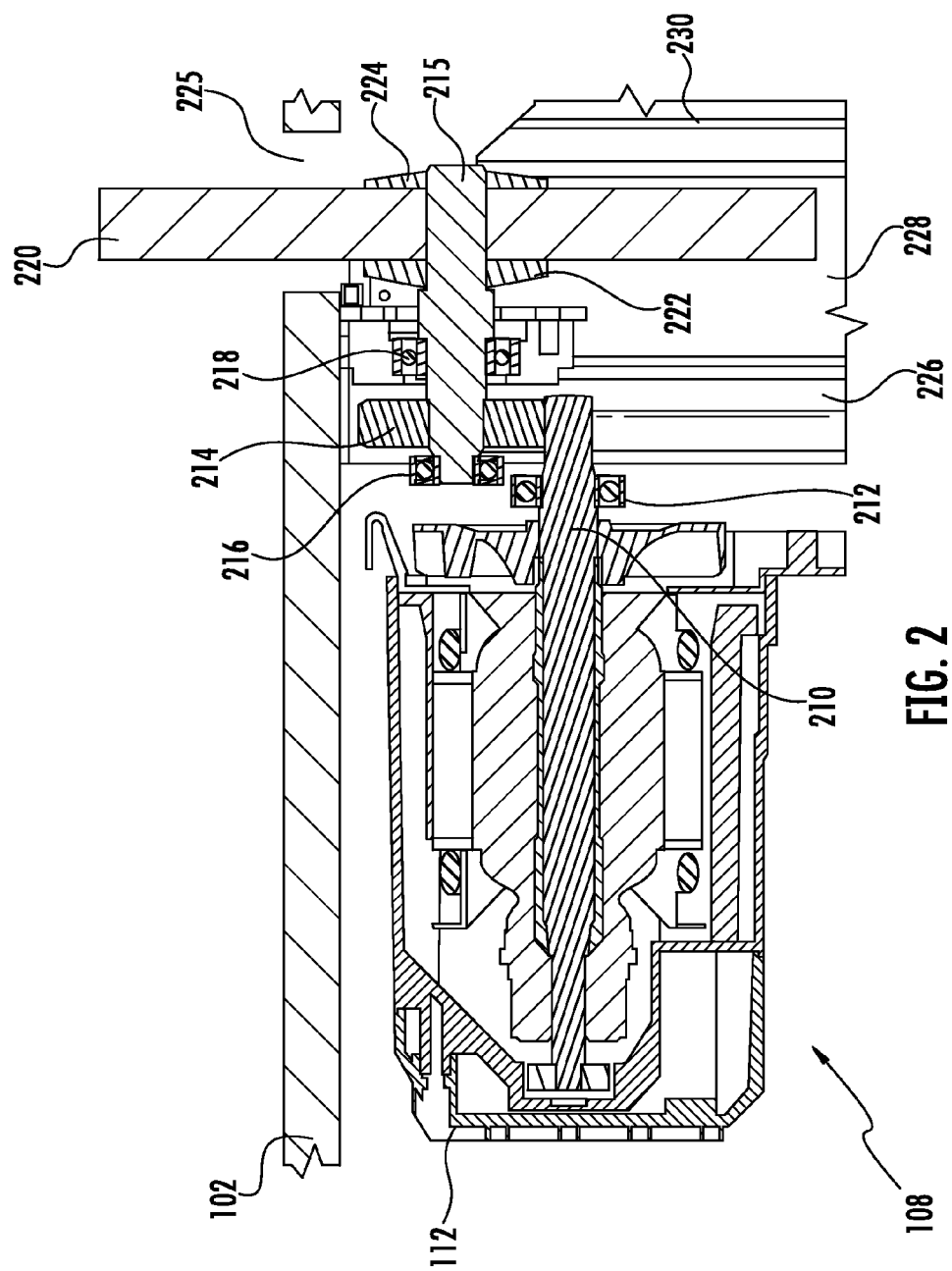
FIG. 2 is sectional schematic plan view of an undercarriage assembly of a table saw.

FIG. 2 illustrates a sectional plane schematic view of the undercarriage assembly 108 of the table saw 100. The undercarriage assembly 108 includes the motor 112 which rotationally drives a motor shaft 210 supported by a bearing 212. The motor shaft 210 is operatively coupled to a gear mechanism 214 which rotates an arbor shaft 215. The arbor shaft 215 is rotationally supported by a first arbor bearing 216 and a second arbor bearing 218, each of which is located on opposites sides of the gear mechanism 214. The arbor shaft 215 rotates a dado blade 220 which is held stationary to the arbor shaft 215 by an arbor flange 222 and an arbor washer 224. The dado blade 220 extends through an aperture 225 disposed in a throat insert located in the table top 102. An undercarriage 226 is operatively coupled to the height adjustment actuator 200 of FIG. 1, and in response to movement of the actuator 200, the actuator 200 moves the motor 108 upward and downward to position the dado blade 220 to a desired position. The actuator 200 is coupled with the bevel mechanism which moves and locks undercarriage assembly 108 to a desired bevel position. A cover 230 is coupled to the housing 228 and provides an openable and closable cover to permit access to the dado blade 220. Bevel movement of the actuator 200 moves the entire undercarriage assembly 108, including the motor 112, the motor shaft 210, the arbor shaft 215, and the dado blade 220 as a single unit.

Figure 3:
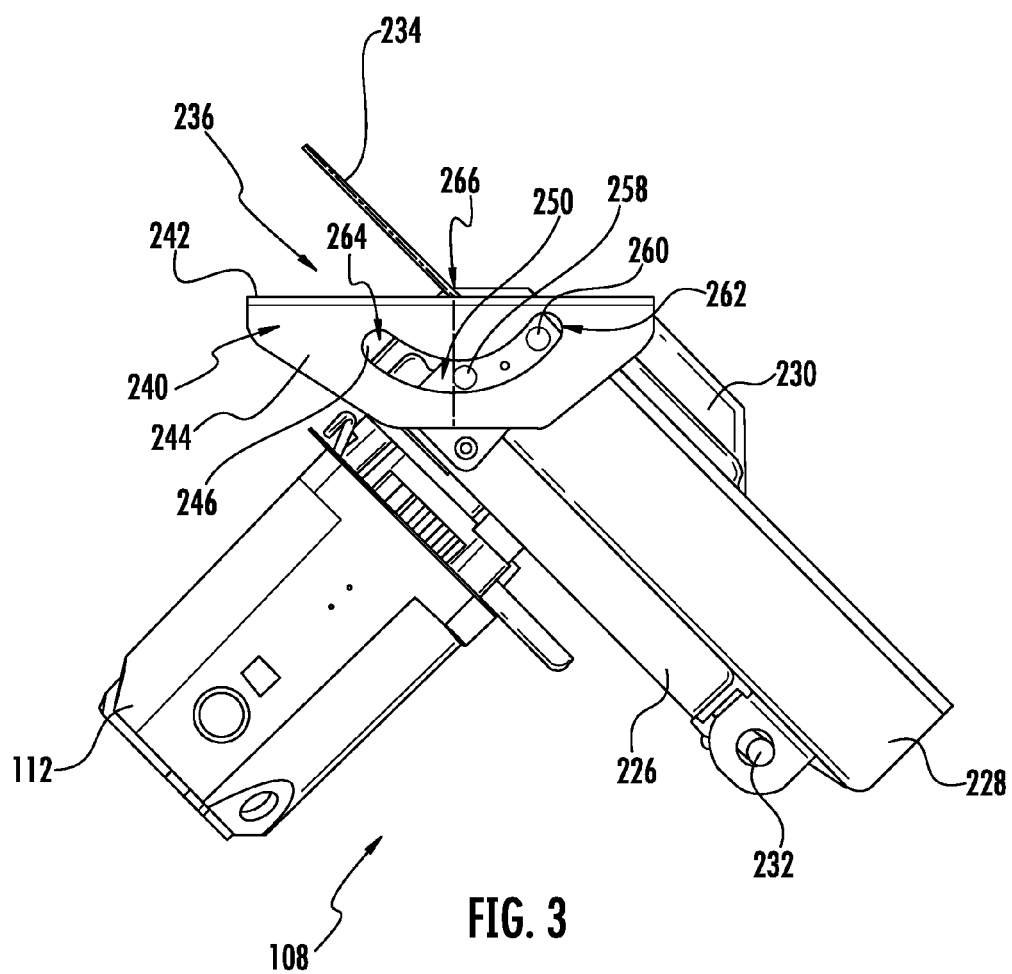
FIG. 3 is a plan view of an undercarriage assembly of a table saw disposed at a 45 degree angle with respect to a work piece support surface.

To adjust the angle of the blade 220 with respect to the surface of the table top 102, the undercarriage 226 includes a shaft 232 which is connected to the undercarriage 226 and to the actuator 200, as illustrated in FIG. 3. Bevel movement of the actuator 200 therefore moves the shaft 232 and the undercarriage assembly 108 though an arcuate trajectory which adjusts angular position of the blade 220, here illustrated as a centerline 234 of the blade 220. To enable movement of the blade 220, the entire undercarriage assembly 108 is supported at a first end of the assembly 108 by a bevel pivoting mechanism 236. The bevel pivoting mechanism 236 includes a table mounting bracket 240 operatively coupled to the table top 102 (not shown). While the table mounting bracket 240 in one embodiment is directly coupled to an underneath side of the table top 102, other embodiments include mounting the bracket 240 to a frame structure of the support arrangement 101. Other supporting arrangements are also possible.

The mounting bracket 240 includes a first planar or top portion 242 coupled to a second planar or supporting portion 244, which is further illustrated in FIG. 4. The supporting portion 244 extends substantially perpendicular to the top portion 242 and includes an aperture 246. The aperture 246 includes a generally arcuate configuration to direct movement of the undercarriage assembly 108 when a bevel adjustment is made to the blade 220. The top portion 242 includes a substantially planar surface to mount the top portion 242 substantially parallel to the working surface of the table top 102. Consequently, mounting of the table mounting bracket 240 to the table top 102 or other structure is made without the need for additional alignment structure to insure correct alignment of the mounting bracket 240 with respect to the table top 102. See FIG. 4 for a plan view of another embodiment of the table mounting bracket 240. In this embodiment the end 262 and end 264 terminate along a same horizontal plane parallel to the first planar portion 242.

An undercarriage mounting bracket 250 is mounted to the undercarriage 226 and housing 228 as illustrated in FIG. 3. In other embodiments, the undercarriage mounting bracket 250 is mounted to the undercarriage 226 or to the housing 228. As also illustrated in FIG. 5, the undercarriage mounting bracket 250 includes a planar portion 252 including a first aperture 254 and a second aperture 256 each of which provide mounting structures to mount the bracket 250 to the undercarriage assembly 108. Fasteners (not shown) are inserted through the first and second apertures 254 and 256 to fixedly mount the bracket 250 to the one of or both of the undercarriage 226 and the housing 228 at a location such that a first projection 258 and a second projection 260 extend through the arcuate aperture 246. Each of the projections, or pins, 258 and 260, have a diameter of a predetermined size to fit within the arcuate aperture 246 and a sufficient length to extend through the aperture and the plane of the supporting portion 244 to provide support for the undercarriage assembly 108 to be moved along a predetermined trajectory.

The predetermined trajectory of the undercarriage assembly is determined by the shape of the arcuate aperture 246 and the location of the pins 258 and 260 with respect to the aperture including the distance between the pins 258 and 260.

Figure 6:
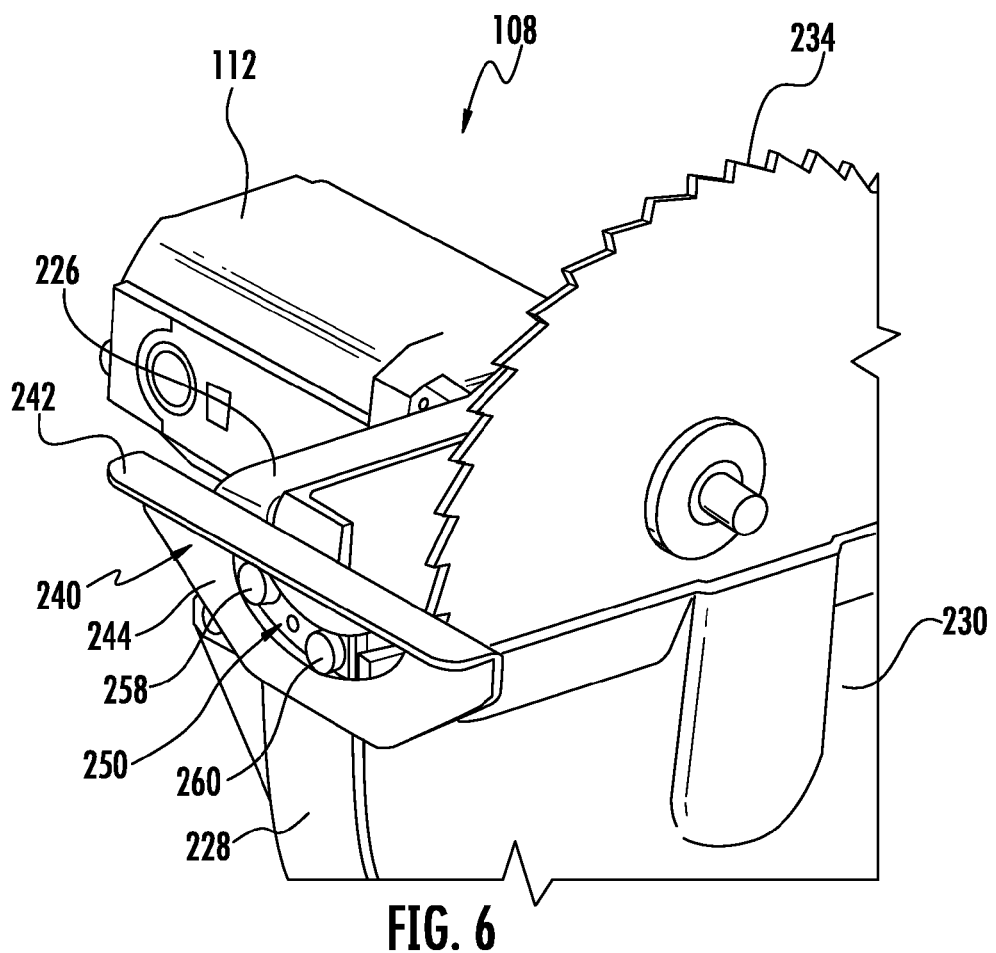
FIG. 6 is a perspective view of an undercarriage assembly of a table saw.

As seen in FIG. 3, the undercarriage assembly 108 has been adjusted to position the blade centerline 234 at about a 45 degree angle with respect to the plane of the table top 102. As seen in the perspective view of FIG. 6, the undercarriage assembly 108 has been adjusted to place the blade at about a 90 degree angle with respect to the plane of the table top 102. FIG. 6 also illustrates that each of the pins 258 and 260 extends past a surface of the supporting portion 244.

Because a dado blade is wider than a standard blade and therefore requires a greater arbor length, traditional bevel mechanisms create an arbor interference with a table throat insert. To provide maximum cutting capacity, a combination of longer arbor and range of pivoting motion is required to achieve a desired bevel angle of at least 45 degrees.

Figure 7:
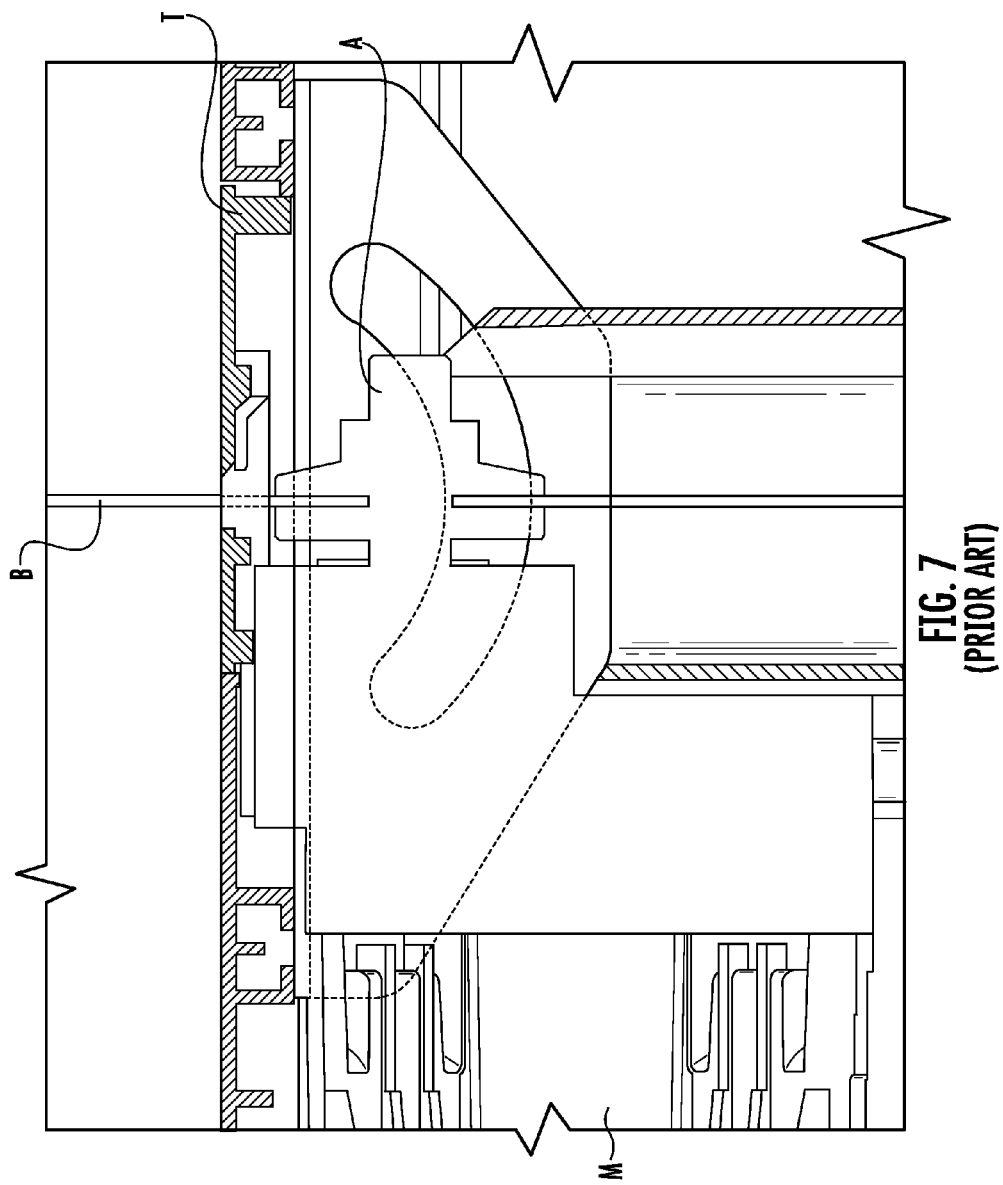
FIG. 7 is a sectional view of a prior art table saw having a motor at a maximum cutting capacity for a saw blade at zero degrees bevel angle.
Figure 8:
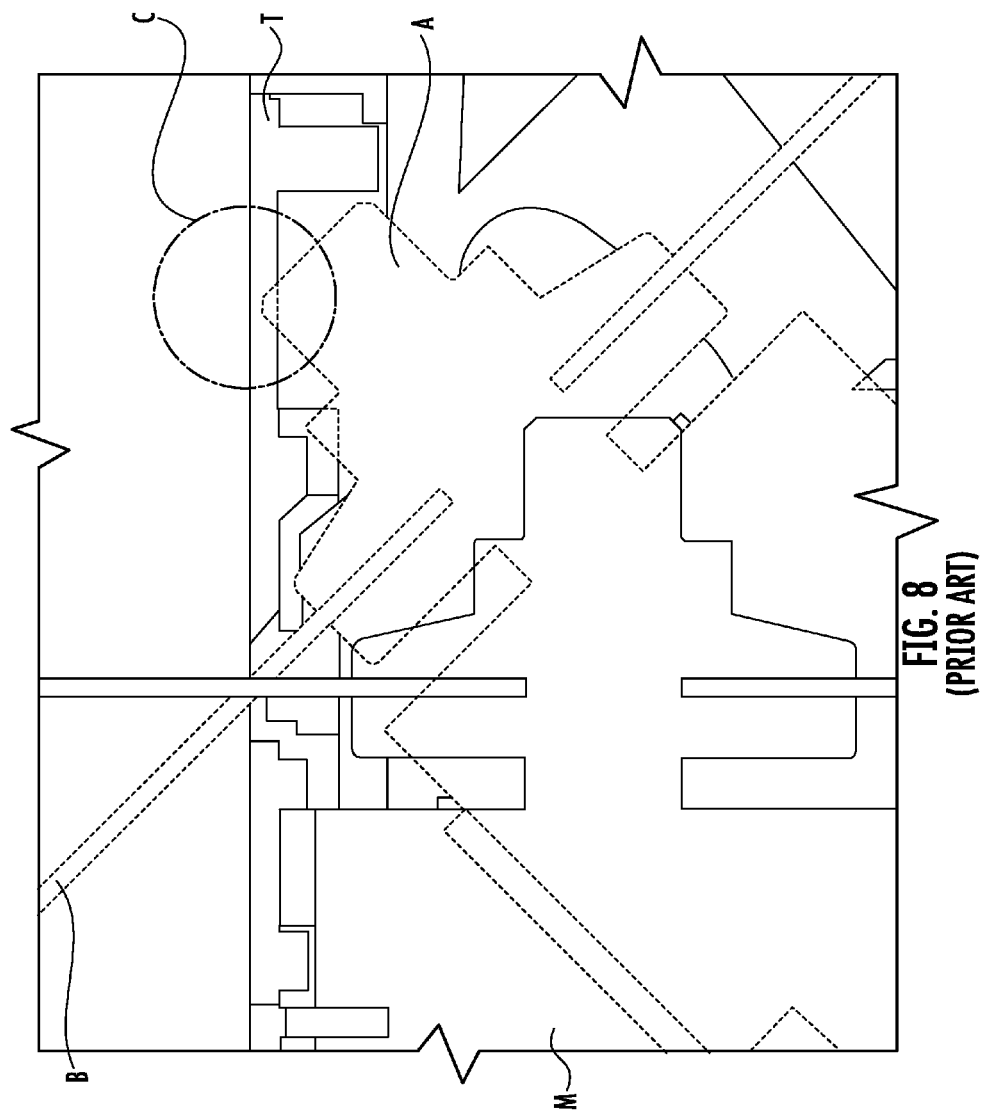
FIG. 8 is a sectional view of a prior art table saw with a saw blade at forty-five degrees and an arbor for a dado blade with the arbor and a table insert interference.

FIGS. 7 and 8 illustrate a prior art table saw which shows the occurrence of interference between an arbor A interfering with a table insert T. As seen in FIG. 7, the prior art table saw is illustrated as having a motor M at a maximum cutting capacity for a saw blade B at zero degrees bevel angle with respect to vertical as illustrated. As seen in FIG. 8, the sectional view of a prior art table saw with the saw blade B at forty-five degrees with respect to vertical shows that the arbor A contacts and interferes with the table insert T illustrated by the dashed circle C to highlight the contact.

Figure 9:
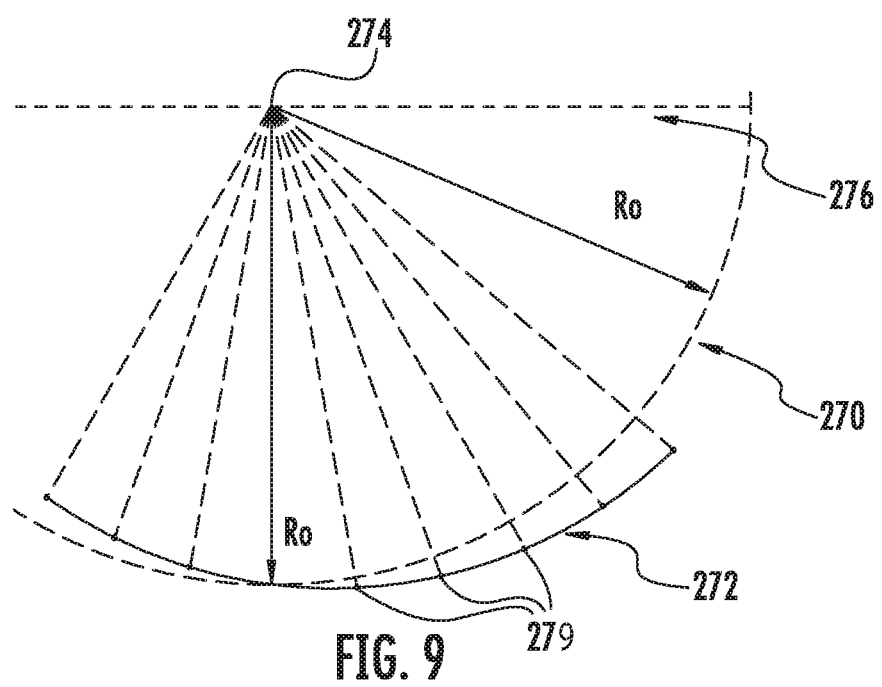
FIG. 9 is a graphical representation of a trajectory path of one embodiment of the present invention.

For the present disclosure, however, the undercarriage assembly 108 is designed to move in a downward direction while pivoting from a ninety degree angle. By moving in a downward direction, the cutting capacity of the blade centerline 234 at 90 degrees and at a maximum exposed position above table surface 104 is substantially increased. In addition, the blade pivots around the phantom axis located on table top to provide maximum accuracy and to provide a desired arbor length for accepting a wide Dado blade. Interference at 45 degrees is also avoided. In one embodiment, the arcuate aperture 246 includes a first end 262 which is closer to the first portion 242 than a second end 264. In addition, a centerline 266 of the bracket 240 is mounted such that the centerline 266 is aligned at a point located at an intersection of the centerline 234 of the blade with the working surface or plane of the table top 102. The curvature of the arcuate aperture 246 and the location of the pins 258 and 260 are selected such that the pivoting motion of the undercarriage assembly follows a trajectory such that a radius, for instance taken from the above described intersection to a point on the housing located in line with the blade, increases along the trajectory. The trajectory in one embodiment is described as an involutes pivoting trajectory having a profile defined by radius whose length increases with increased bevel angle as illustrated in FIG. 9. To summarize, the undercarriage assembly 108 moves in a downward direction while pivoting from a ninety (90) degree angle: 1) to maximize the cutting capacity provided at ninety (90) degrees while having the blade 234 at a maximum exposed position above the table surface 104; 2) to provide a phantom blade pivot about a phantom axis located on the table top for maximum accuracy; 3) to have a desired arbor length for accepting a wide Dado blade and 4) to avoid interference at forty five (45) degrees.

FIG. 9 illustrates a known pivoting trajectory defined by a radius $R_0$ 270 where $R_0$ remains constant throughout the trajectory. In the present embodiment having an involutes pivoting trajectory, illustrated by the line 272, the radius increases with increased bevel angle. Each of the radii, which increase in length with an increase in the bevel angle, extends from a movable pivot axis 274 to a predetermined point 279 on the undercarriage assembly 108. The trajectory of the increasing radius is based on the following equation:

$$Rx = R_0 + J/K$$

where J=bevel angle
K=constant.

In one embodiment for example, the equation $Rx=R_0+J/10$ provides a change in the length of the radius of the trajectory of 1 mm every 10 degrees where $R_0$ equals 50 mm.

Figure 10:
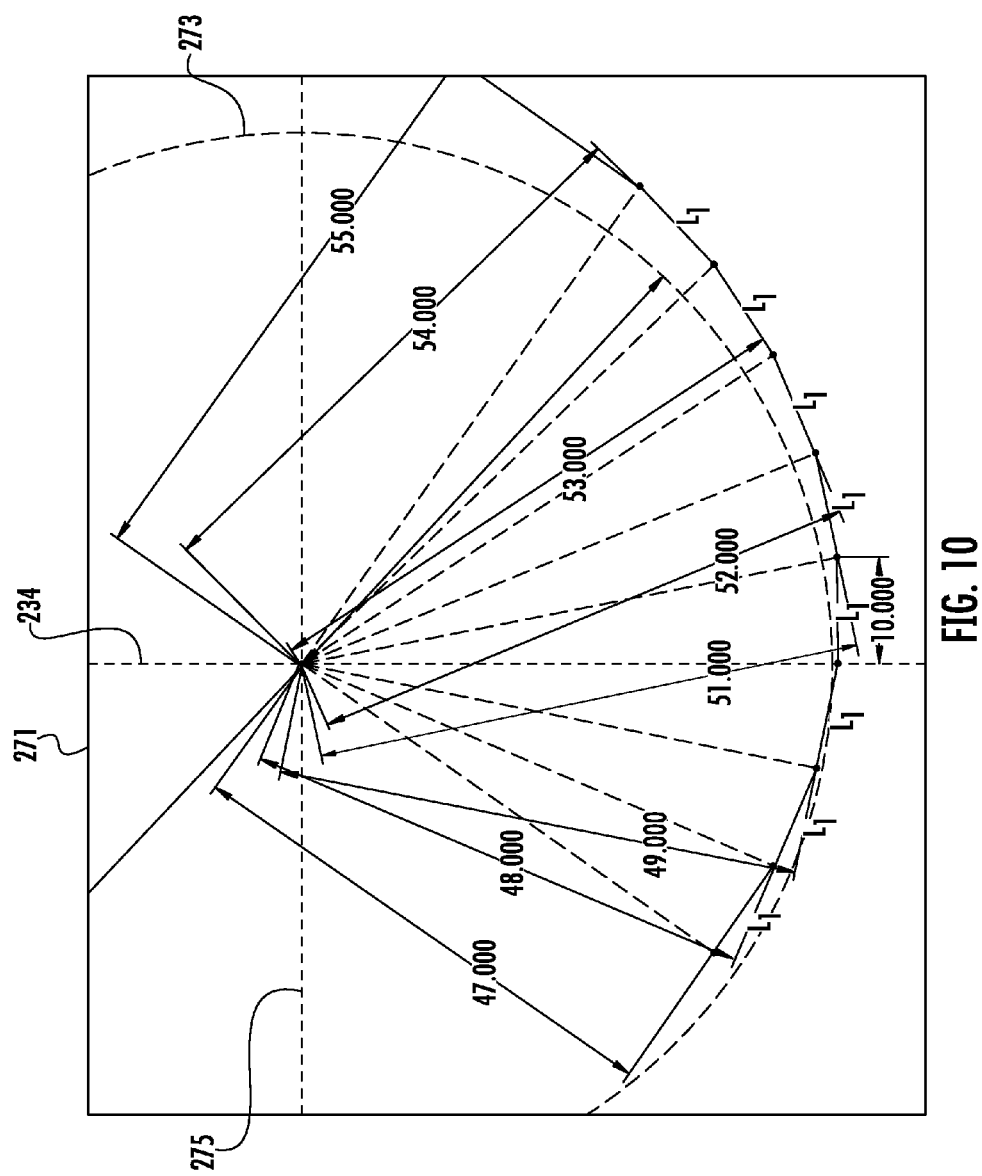
FIG. 10 is a graphical representation of a trajectory path of another embodiment of the present invention.

In another embodiment as illustrated in FIG. 10, the profile of the trajectory follows an involutes profile where a length of the radius increases according to a predetermined fraction of the same chord length corresponding to the bevel angle with a pivoting axis located at the pivot point 271. As illustrated in FIG. 10, the pivot point 271 is located at the surface of the table top 102, here line 275, and the centerline 234 of the blade. In this embodiment, the involutes profile follows a trajectory according to the following equation:

$$Rx = R_0 + Kn$$

where n=a chord number and
K=a constant.

For example, using the above equation, the radii change 1 mm for every 10 mm chord length where $R_0$=50 mm, see line 273 as illustrated in FIG. 10. Each of the radii, which increase in length with an increase in the bevel angle, extends from a movable pivot axis disposed above the plane of the table top 102, line 275. In both of the described embodiments of described above, the movable pivot axis is considered to be a "phantom" pivot axis which provides a high accuracy of cuts at a variety of bevel angles.

In the embodiments described above, the radius increases as the bevel angle increases. Since the radius increases, the entire undercarriage assembly 108 moves further away from the table top surface and consequently further away from any structure located below the table top surface to accommodate the increased length of the arbor shaft 215 and to provide pivoting around a center located on table top for better accuracy. While the entire assembly 108 moves further away from the underneath side of the table top 102, such movement is particularly important when considering the end of the arbor shaft 215, the flange 222, and the washer 224. Such movement, not only eliminates contact of these parts with the underneath side of the table, but also increases the bevel angle which can be achieved with a blade. Consequently, as the blade angle changes from zero to larger angles, the arbor shaft 215, the flange 222, and the washer 224 move further away from and down from the table top 102.

In one embodiment, using an arbor supporting a 13/16 inch dado blade having a vertical cutting capacity of approximately 4 inches (91 mm), a bevel angle of 47 degrees can be achieved and without interference. To accommodate the stress which appears between the undercarriage support and the carriage support in the above configurations, each of the pieces is made of a metal or other high tensile strength material.

Figure 11:
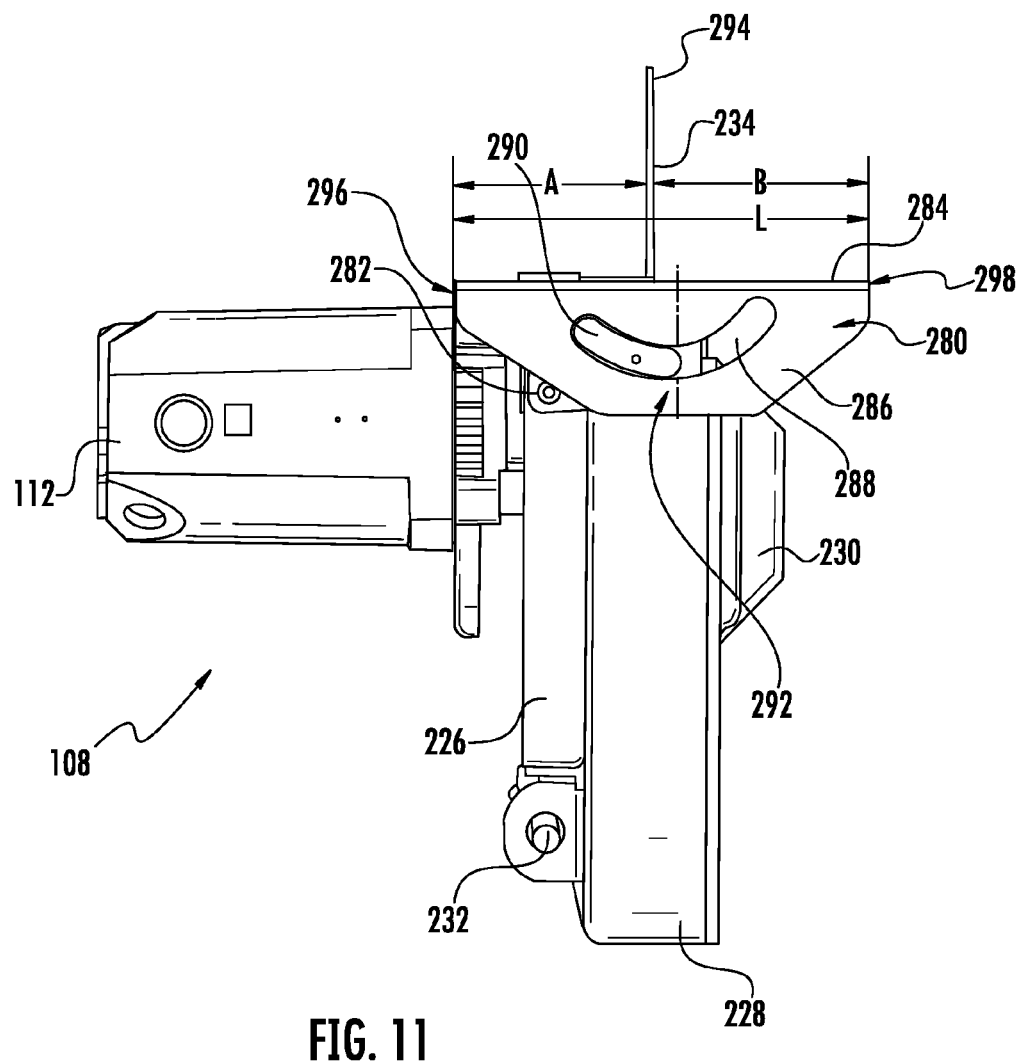
FIG. 11 is an elevational view of a constant radius pivoting mechanism including a table mounting bracket and an undercarriage mounting bracket in a first position.

FIG. 11 illustrates another embodiment of the present invention including a table mounting bracket 280 and an undercarriage mounting bracket 282. The table mounting bracket 280 includes a first planar or top portion 284 coupled to a second planar or supporting portion 286. The supporting portion 286 includes an arcuate aperture or slot 288 which receives an arcuate projecting portion 290 of the undercarriage mounting bracket 282. In this embodiment, while the undercarriage mounting bracket 282 is mounted to the undercarriage assembly 108 as described in the prior embodiments, the table mounting bracket 280 is mounted to the underneath side of the table top such that a centerline 292 of the table mounting bracket 280 is offset from a centerline 294 of the blade as illustrated in FIG. 11. As can be seen, while the top portion 284 includes a length L, the mounting bracket 280 is located such that a distance A between a first end 296 of the mounting bracket and the centerline 294 is less than a distance B between a second end 298 of the mounting bracket 280 and the centerline 294. In this embodiment, the radius of a trajectory of the undercarriage assembly remains constant but the pivot axis about which the undercarriage assembly pivots is located above the surface of the table top.

FIG. 12 illustrates the position of the undercarriage mounting bracket 282 within the table mounting bracket 280 when the saw blade is located at a 90 degree angle with respect to the table top 102. In this embodiment, the arcuate projection portion 290 includes an arcuate shape substantially similar to the arcuate shape of the slot 288. In addition, because the pivoting action of the undercarriage assembly 108 includes a constant radius about the pivoting point, in one embodiment, a first end 300 of the arcuate slot 288 is displaced the same distance from the top portion 284 as a second end 302 is displaced from the top portion 284. Because both the table top support 280 and the undercarriage support 282 provide for a trajectory having a substantially constant radius, the amount of stress applied to the top support 280 and the undercarriage support 282 when compared to the prior embodiments is reduced, and consequently materials of reduced strength, such as plastics, are used in some embodiments. The undercarriage support 282 includes a first and second aperture 304 and 306 for mounting the support 282. While the embodiment of FIG. 11 illustrates a bracket 280 including a slot 288 similar to the support of FIG. 3, the projection portion 290 is limited in movement by a stop (not shown) which limits movement of the portion 290 in the slot 288 to that as illustrated in FIG. 13.

FIG. 13 illustrates the position of the undercarriage mounting bracket 282 within the table mounting bracket 280 when the saw blade is located at a 45 degree angle with respect to the table top 102. In this embodiment, the arcuate projection portion 290 is located at the opposite end of the slot 288.

In the embodiment of FIG. 13, even though the centerline 292 of the bevel pivoting mechanism 236 is offset from the centerline 234 (see FIG. 11), a horizontal deviation of the saw blade (the amount the blade moves side to side during beveling of the saw blade) is substantially zero at the most common bevel angles of zero and forty-five degrees. In addition, a vertical deviation, the amount the teeth of saw blade move up or down with respect to the support surface 104, is minimal and changes approximately less than 5.8 millimeter when adjusted from zero to forty-five degrees. Consequently, the embodiment described in FIG. 13 provides cuts of a high accuracy.

Figure 14:
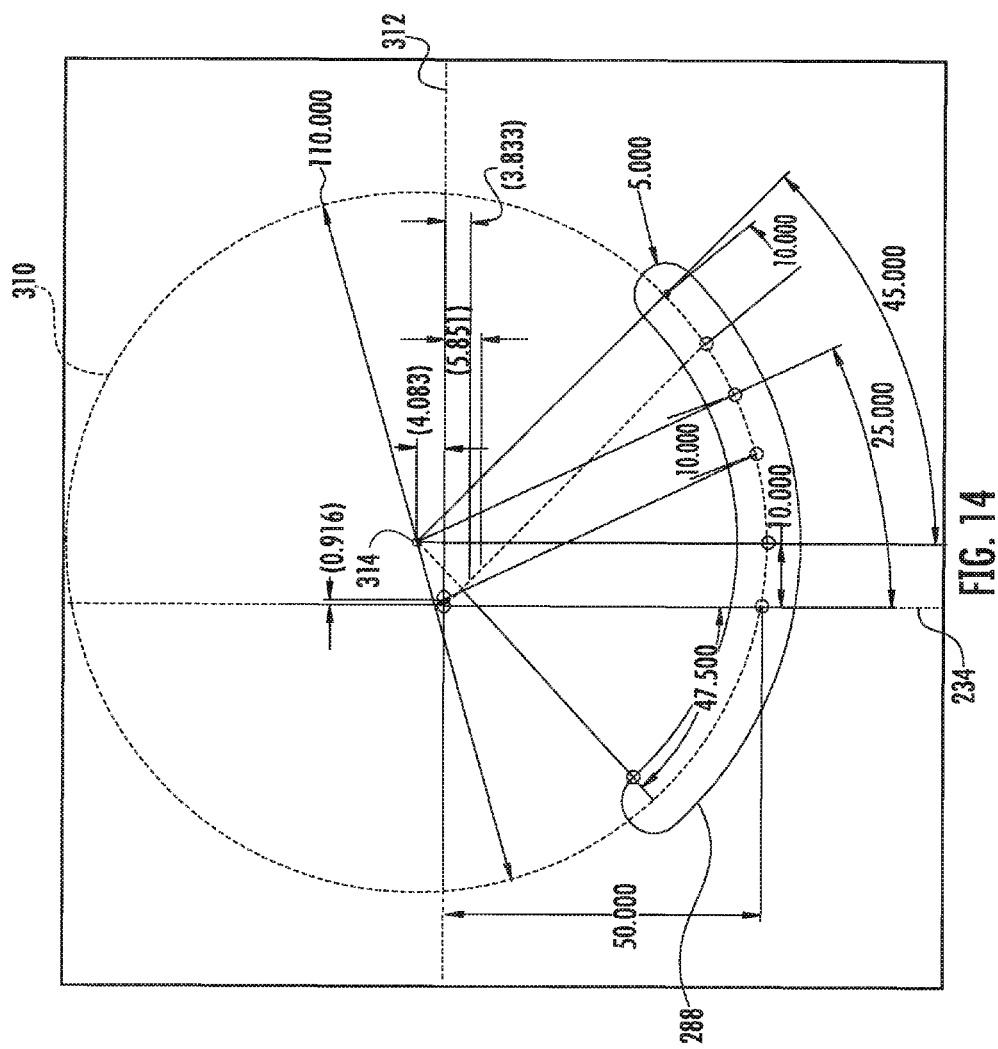
FIG. 14 is a graphical representation of an undercarriage assembly-bevel pivoting mechanism having a constant radius.

FIG. 14 is a graphical representation of the undercarriage assembly-bevel pivoting mechanism having a constant radius where the centerline 234 of the blade is offset with zero horizontal deviation for a zero and a forty-five degree bevel angle. As can be seen in FIG. 14, the slot 288 is illustrated and a dotted line circle 310 illustrates a radius about which the vertical plane of the saw blade moves when beveled into different positions about pivot point 314. The table surface 104 is indicated by the dotted line 312 and, as shown in FIG. 14, the pivot point 314 is located above the table surface 104 for each position of the saw blade and the saw undercarriage assembly 108. Horizontal and vertical deviations are illustrated and correspond to tabular and graphical representations as illustrated in FIG. 15.

Figure 15:
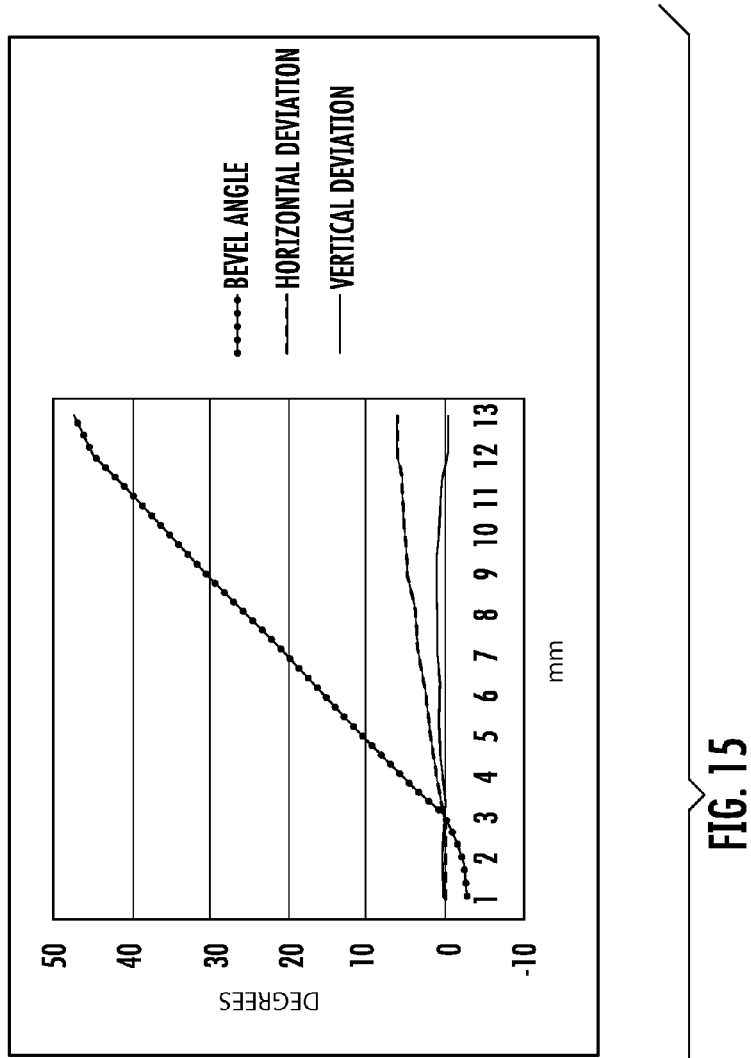
FIG. 15 is a tabular and a graphical representation of a vertical deviation over a range of bevel angles for an undercarriage assembly-bevel pivoting mechanism having a constant radius.

As seen in FIG. 15 horizontal and vertical deviations are stated in millimeters and correspond to a bevel angle which is stated in degrees. The horizontal and the vertical deviation over a range of bevel angles for the undercarriage assembly-bevel pivoting mechanism having a constant radius are shown from −2.5 degrees to 47.5 degrees. As can be seen, a constant radius with a blade offset having zero horizontal deviation for zero and forty-five degrees is achieved. The graphical representation illustrates the horizontal and vertical deviations in millimeters along the x axis with respect to the y axis in degrees of bevel.

FIG. 16 is a sectional view of the motor 112 and, the arbor shaft 215, and the arbor flange 222 having zero interference with the table saw insert 111 at a forty-seven degrees bevel angle for the constant radius embodiment of FIG. 11.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A table saw, comprising:
a support arrangement;
a table top assembly connected to the support arrangement, the table top assembly including a work piece support surface defining a work piece support plane and a saw blade opening in the work piece support surface; and
an undercarriage assembly pivotably mounted to the table top assembly and configured to support a saw blade at an adjustable bevel angle relative to the work piece support plane, the undercarriage assembly including (i) a housing at least partially surrounding a portion of the saw blade, (ii) a motor supported on the housing and including an arbor shaft configured to support the saw blade in the saw blade opening, and (iii) a bevel pivoting mechanism configured to pivot the housing, the motor, and the saw blade about a pivot axis to adjust the bevel angle of the saw blade with respect to the work piece support plane,
wherein a pivot trajectory is defined by a plurality of predetermined points on the housing as the bevel angle of the saw blade is adjusted away from a perpendicular angle using only the bevel pivoting mechanism,
wherein at the perpendicular angle a longest portion of the saw blade forms a ninety degree angle with the work piece support plane,
wherein a corresponding radius of a plurality of radii extends from the pivot axis to each predetermined point of the plurality of predetermined points, and
wherein a corresponding length of the radii of the plurality of radii increases as the bevel angle of the saw blade is adjusted away from the perpendicular angle using only the bevel pivoting mechanism.

2. The table saw of claim 1 further comprising:
a table mounting bracket coupled to the table top assembly and including a slot defining a vertical centerline; and
an undercarriage mounting bracket coupled to the undercarriage assembly and configured to be movably supported within the slot,
wherein adjustment of the bevel angle of the saw blade displaces the undercarriage mounting bracket with respect to the table mounting bracket, and
wherein the saw blade defines a vertical centerline that is offset from the vertical centerline defined by the slot when the undercarriage assembly is moved to a position that supports the saw blade at the perpendicular angle.

3. The table saw of claim 2 wherein:
the table mounting bracket includes one of a channel and a projection and the undercarriage mounting bracket includes the other of the channel and the projection, and
the projection is configured to engage the channel during adjustment of the bevel angle of the saw blade.

4. The table saw of claim 3 wherein:
the channel comprises an arcuate channel and the projection comprises an arcuate projection, and
the arcuate projection is configured to slide in the arcuate channel during adjustment of the bevel angle of the saw blade.

5. The table saw of claim 3 wherein:
the channel comprises an arcuate channel and the projection comprises a plurality of pins, and
the plurality of pins is configured to slide in the arcuate channel during adjustment of the bevel angle of the saw blade.

6. The table saw of claim 1 wherein:
an intersection point is defined by an intersection of the work piece support plane and a perpendicular plane of the saw blade when the saw blade is positioned at the perpendicular angle, and
the pivot axis is offset from the intersection point.

7. The table saw of claim 6 further comprising:
a table mounting bracket coupled to the table top assembly; and
an undercarriage mounting bracket coupled to the undercarriage assembly,
wherein adjustment of the bevel angle of the saw blade displaces the undercarriage mounting bracket with respect to the table mounting bracket.

8. The table saw of claim 7 wherein:
the table mounting bracket includes a channel the undercarriage mounting bracket includes a projection, and
the projection is configured to engage the channel during the adjustment of the bevel angle of the saw blade.

9. The table saw of claim 8 wherein:
the channel comprises an arcuate channel and the projection comprises an arcuate projection, and
the arcuate projection is configured to slide in the arcuate channel during adjustment of the bevel angle of the saw blade.

10. The table saw of claim 8 wherein:
the channel comprises an arcuate channel and the projection comprises a plurality of pins, and
the plurality of pins is configured to slide in the arcuate channel during adjustment of the bevel angle of the saw blade.

11. The table saw of claim 1 wherein the saw blade pivots about the pivot axis with zero horizontal deviation from the pivot axis to provide maximum accuracy.

12. The table saw of claim 1 wherein:
at a saw blade angle of forty-five degrees and zero degrees the saw blade exhibits zero horizontal deviation from the pivot axis, and at a saw blade angle of other than forty-five degrees and zero degrees the saw blade exhibits a non-zero horizontal deviation from the pivot axis.

13. The table saw of claim 1 wherein the pivot axis is located above the work piece support plane for each position of the housing as pivoted by the bevel pivoting mechanism.

14. The table saw of claim 1, wherein:
the radius is 50 mm when the bevel pivoting mechanism positions the saw blade at the perpendicular angle, and
the radius increases 1 mm for every 10 degrees of bevel angle that the bevel pivoting mechanism adjusts the saw blade away from the perpendicular angle, such that at a bevel angle of 45 degrees the radius is 54.5 mm.

15. A table saw, comprising:
a support arrangement;
a table top assembly connected to the support arrangement, the table top assembly including a work piece support surface defining a work piece support plane and an insert portion; and
an undercarriage assembly pivotably mounted to the table top assembly and configured to support a saw blade at an adjustable bevel angle relative to the work piece support plane, the undercarriage assembly including (i) a housing, (ii) a motor supported on the housing and including an arbor configured to support the saw blade at least partially in the housing, and (iii) a bevel pivoting mechanism configured to pivot the housing, the motor, and the saw blade about a pivot axis to adjust the bevel angle of the saw blade with respect to the work piece support plane,
wherein the housing, the motor, and the arbor move away from the pivot axis as the bevel angle is adjusted away from a perpendicular angle of the saw blade using only the bevel pivoting mechanism, such that the arbor is prevented from contacting the insert portion of the table top assembly, and
wherein at the perpendicular angle a longest portion of the saw blade forms a ninety degree angle with the work piece support plane.

16. The table saw of claim 15 wherein the pivot axis is located above the work piece support plane for each position of the housing as pivoted by the bevel pivoting mechanism.

17. The table saw of claim 16 wherein:
a pivot trajectory is defined by a plurality of predetermined points on the housing as the bevel angle of the saw blade is adjusted away from the perpendicular angle using only the bevel pivoting mechanism,
a corresponding radius of a plurality of radii extends from the pivot axis to each predetermined point of the plurality of predetermined points, and
a corresponding length of the radii of the plurality of radii increases as the bevel angle of the saw blade is adjusted away from the perpendicular angle using only the bevel Pivoting mechanism.

18. The table saw of claim 17 wherein the pivot trajectory of the housing has an involute profile.

* * * * *